US012674958B2

(12) United States Patent
Rothbucher

(10) Patent No.: US 12,674,958 B2
(45) Date of Patent: Jul. 7, 2026

(54) DEVICE FOR PLACING MARKINGS

(71) Applicant: Georg Rothbucher, Bad Reichenhall (DE)

(72) Inventor: Georg Rothbucher, Bad Reichenhall (DE)

( * ) Notice: Subject to any disclaimer, the term of this patent is extended or adjusted under 35 U.S.C. 154(b) by 441 days.

(21) Appl. No.: 18/310,946

(22) Filed: May 2, 2023

(65) Prior Publication Data

US 2023/0358997 A1 Nov. 9, 2023

(30) Foreign Application Priority Data

May 6, 2022 (DE) ..................... 20 2022 102 499.5

(51) Int. Cl.
| | |
|---|---|
| *G02B 7/18* | (2021.01) |
| *G01C 15/00* | (2006.01) |
| *G02B 5/122* | (2006.01) |

(52) U.S. Cl.
CPC ......... G02B 7/1805 (2013.01); G01C 15/002 (2013.01); *G02B 5/122* (2013.01)

(58) Field of Classification Search
CPC ...... G02B 7/1805; G02B 7/182; G02B 5/122; G01C 15/002; G01C 15/04
USPC ..................... 359/529, 833, 872; 33/293, 295
See application file for complete search history.

(56) References Cited

U.S. PATENT DOCUMENTS

| | | | | |
|---|---|---|---|---|
| 3,736,058 A | * | 5/1973 | Iadarola | G01C 15/002 33/DIG. 21 |
| 4,470,664 A | * | 9/1984 | Shirasawa | G02B 5/122 356/152.3 |

| | | | | |
|---|---|---|---|---|
| 4,519,674 A | * | 5/1985 | Buckley | G01C 15/02 359/515 |
| 4,875,291 A | * | 10/1989 | Panique | G01C 15/06 359/527 |
| 5,231,539 A | * | 7/1993 | McMillen | G02B 5/122 359/876 |
| 5,311,222 A | * | 5/1994 | Buckley | G02B 5/122 356/4.01 |
| 5,392,521 A | * | 2/1995 | Allen | G01C 15/02 359/833 |
| 6,324,024 B1 | * | 11/2001 | Shirai | G02B 5/122 359/884 |

(Continued)

FOREIGN PATENT DOCUMENTS

| | | |
|---|---|---|
| DE | 29915166 U1 | 8/1999 |
| DE | 20118240 U1 | 2/2002 |

(Continued)

OTHER PUBLICATIONS

Search Report in Corresponding German Patent Application DE202022102499.5 Dec. 22, 2022.

*Primary Examiner* — Ricky D Shafer
(74) *Attorney, Agent, or Firm* — McGarry Bair PC

(57) ABSTRACT

Described is a device for placing markings on components. The device comprises a contact part to be placed against the component, a sliding element which is arranged slidably on the contact part between a first and a second position, and a reflector which is connected to the sliding element. The contact part comprises at least one continuous marking hole defining a marking point. The marking point and the reflector are arranged along an alignment axis when the sliding element is in the first position. In a second position of the sliding element, the marking hole is accessible.

13 Claims, 10 Drawing Sheets

(56)          References Cited

U.S. PATENT DOCUMENTS

| | | | | |
|---|---|---|---|---|
| 7,886,450 | B1 * | 2/2011 | Fiano .................. | G01C 15/105 |
| | | | | 33/290 |
| 9,291,454 | B2 * | 3/2016 | Rothbucher ........... | G01C 15/06 |
| 11,781,866 | B1 * | 10/2023 | Lockhart .............. | G01C 15/105 |
| | | | | 33/286 |
| 2012/0010847 | A1 * | 1/2012 | Hamel .................. | G01C 15/06 |
| | | | | 702/150 |
| 2017/0205229 | A1 | 7/2017 | Tokuda | |
| 2022/0364861 | A1 * | 11/2022 | Rothbucher ........... | G01C 15/02 |

FOREIGN PATENT DOCUMENTS

| | | | |
|---|---|---|---|
| DE | 102005007938 | A1 | 8/2006 |
| DE | 102010016437 | A1 | 10/2011 |
| JP | 2015129650 | A | 7/2015 |
| WO | 2019015970 | A1 | 1/2019 |

* cited by examiner

100

112

608

602

606

612

612

600

604

610

DEVICE FOR PLACING MARKINGS

CROSS-REFERENCE TO RELATED APPLICATIONS

This application claims the benefit of German Application 20 2022 102 499.5, filed May 6, 2022, which is incorporated herein in its entirety.

TECHNICAL FIELD

The invention relates to a device for placing markings on components.

BACKGROUND

In construction site surveying, measuring devices such as lasers, scanners and total stations are regularly used to transmit construction data, for example of a structure, relative to reference points to a terrain or property. For example, the exact positions of individual components of the structure can be determined and marked in the terrain before the structure is built. It can also be used to determine and mark relevant positions on components during construction, for example positions of pipe culverts, recesses in concrete components or suspension positions for construction elements or operational equipment. This process of determining positions and placing markings is also referred to as staking out.

In order to find the positions with the help of the measuring device, reflectors can be used in particular, which are aligned with respect to the total station on components in such a way that they are located in the searched position or indicate the same. The position can then be marked on the component. The aim here is to reduce measurement errors and thus to obtain accurate markings, while at the same time reducing the time required for position determination and subsequent marking.

It is therefore an object of the invention to specify a device for placing markings on components, which device is easy to operate and enables accurate position determination and marking.

This object is solved by the subject-matter of the independent claim. Advantageous embodiments are specified in the dependent claims.

BRIEF DESCRIPTION

A device for placing markings on components, in particular with the aid of a total station, comprises a contact part to be placed against the component, a sliding element which is displaceably arranged in the contact part between a first and a second position, and a reflector which is connected to the sliding element. The contact part comprises at least one continuous marking hole defining a marking point. In particular, the marking point is located on the component when the device is placed against the component. Further, the marking point and the reflector are arranged along an alignment axis when the sliding element is in the first position, and the marking hole is accessible when the sliding element is in the second position. The device according to the invention is also referred to as a stake-out aid.

In particular, the reflector comprises a reflective element, such as a reflective target or a prism, especially a retro-reflective triple prism, which reflect an optical signal of the total station back to the total station. This allows distance measurement and position determination of the reflective element relative to the total station.

The device that is placed against the component can be aligned on the component with the aid of the total station. The position of the reflector, in particular of the reflective element, relative to the total station is determined and guided to a desired position to be marked using construction data. The sliding element can then be displaced to the respective other position to make the marking hole accessible. It is then possible to place a marking on the component through the marking hole, for example with a pencil, without having to move the device. This makes it possible to place markings on components accurately and easily.

Likewise, with the aid of the device and of the total station, it is possible to subsequently check the position of markings that have already been placed.

Preferably, the alignment axis is orthogonal to a plane defined by the contact part. In particular, the plane is defined by a planar contact side that can be placed against the component. This enables a particularly precise alignment of the device.

It is particularly preferred that the contact part comprises a further marking hole that defines a further marking point. The further marking hole is accessible when the sliding element is in the first position. Furthermore, the further marking hole is not accessible when the sliding element is in the second position. Switching between the first and the second position of the sliding element thus exposes either the marking hole or the further marking hole (and the corresponding marking points) while the respective other marking hole is covered by the sliding element. This makes it possible to place markings particularly quickly by using the marking holes alternately.

In a preferred embodiment, the further marking point and the reflector are arranged along a further alignment axis when the sliding element is in the second position. The further alignment axis is preferably orthogonal to the plane of the contact part. This reduces errors in the alignment of the device.

Preferably, the reflector comprises a reflective element that retro-reflects a light beam, and the distance between the marking point and the center of the reflective element along the alignment axis is a predetermined distance. Furthermore, the distance between the marking holes, in particular the marking points, preferably corresponds to the predetermined distance. This makes it possible to take into account the distance between the position of the reflective element determined by means of the total station and the respective marking point in order to align the marking point more precisely with the desired position to be marked.

Preferably, the contact part has an essentially rectangular base area. This enables a particularly compact design.

Preferably, the contact part is configured so that the distance from the marking point of the marking hole to three of the sides of the base surface of the contact part is in each case a further predetermined distance. This enables further markings to be placed with reference to the marking hole.

It is particularly preferred if the predetermined distance is equal to the further predetermined distance. This simplifies the operation of the device, since the distances used are all the same. In particular, the predetermined distance and the further predetermined distance may be 50 mm.

In a preferred embodiment, the contact part comprises markings, each arranged along a line from the marking point of the marking hole to one of the sides of the contact part. This allows for easy orientation and alignment of the device.

Preferably, the sliding element is rotatable about the alignment axis at least in the first position or the second position. When the sliding element is rotated, the reflective element also rotates about the alignment axis. This makes it easy to align the reflector, in particular the reflective element, in the direction of the total station.

Preferably, the sliding element comprises at least one ball thrust piece. The ball thrust piece comprises, for example, a press sleeve with integrated spring and a rotatable ball elastically mounted on the spring. Particularly preferably, the sliding element comprises two ball thrust pieces or four ball thrust pieces. This makes it particularly easy to slide and/or rotate the sliding element.

It is particularly preferred if the contact part comprises at least one contact plate which, on the side facing the sliding element, comprises a groove in which the ball thrust piece can be guided, preferably the groove is arranged in a circle around the alignment axis. In particular, the sliding element can be guided in this way upon rotation of the sliding element about the alignment axis when the sliding element is in the first or the second position. In particular, the sliding element thus engages securely in the first or the second position.

Preferably, the contact plate comprises at least one engagement recess on the side facing the sliding element, into which the ball thrust piece engages when the sliding element is in the first or the second position. Particularly preferably, the contact plate comprises eight engagement recesses arranged along the groove around the alignment axis; in this way, the sliding element can be engaged at different angles during rotation.

Preferably, the sliding element comprises at least one receiving projection onto which an alignment element can be slid. For example, the alignment element comprises at least one spirit level that allows precise alignment of the device, in particular of the reflective element.

Preferably, the contact part comprises rubber elements on the side facing away from the sliding element. This prevents slipping on the component when the device is placed against the component.

Preferably, the contact part comprises magnets. These enable reversible fastening of the stake-out aid to ferromagnetic components.

Preferably, the device comprises an edge part which is detachably arranged on the contact part, one side of the edge part forming a plane which intersects the plane defined by the contact part, in particular by the contact side, at a right angle, and the alignment axis lying in the plane of the edge part. This enables the device to be placed precisely against an edge of the component, in particular an edge of the component which results from two areas of the component being at an angle of 90° to each other. For this purpose, the contact part and the edge part can each be placed against one of the areas so that the marking point is at the edge of the component. In this way, the device and the total station can be used to check the position of the edge of the component or to place a marking along the edge of the component.

BRIEF DESCRIPTION OF THE DRAWINGS

Further features and advantages result from the following description, which explains exemplary embodiments in more detail in connection with the attached figures.

DETAILED DESCRIPTION

Figure 1:
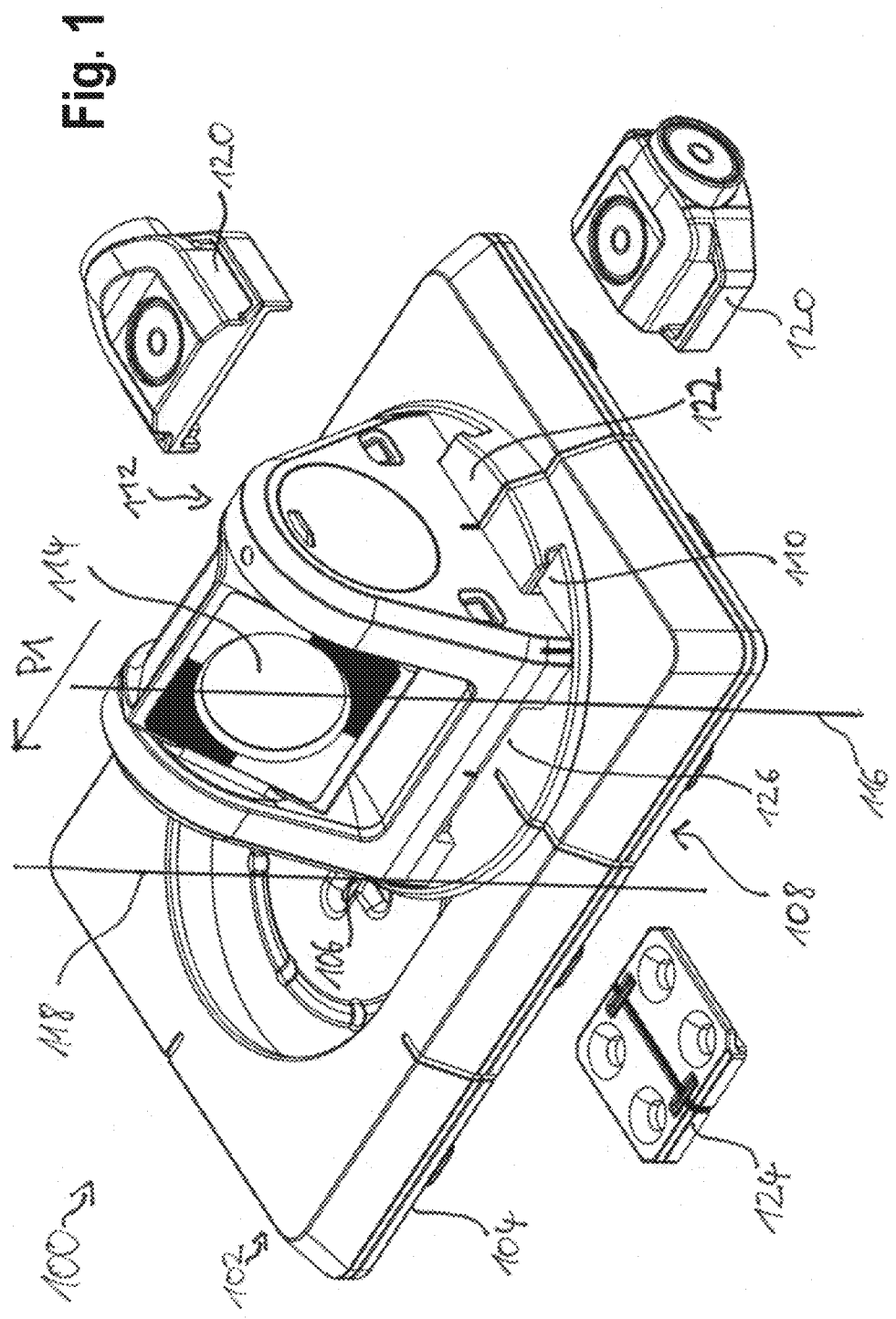
FIG. 1 shows a perspective view of a device for placing markings.
Figure 2:
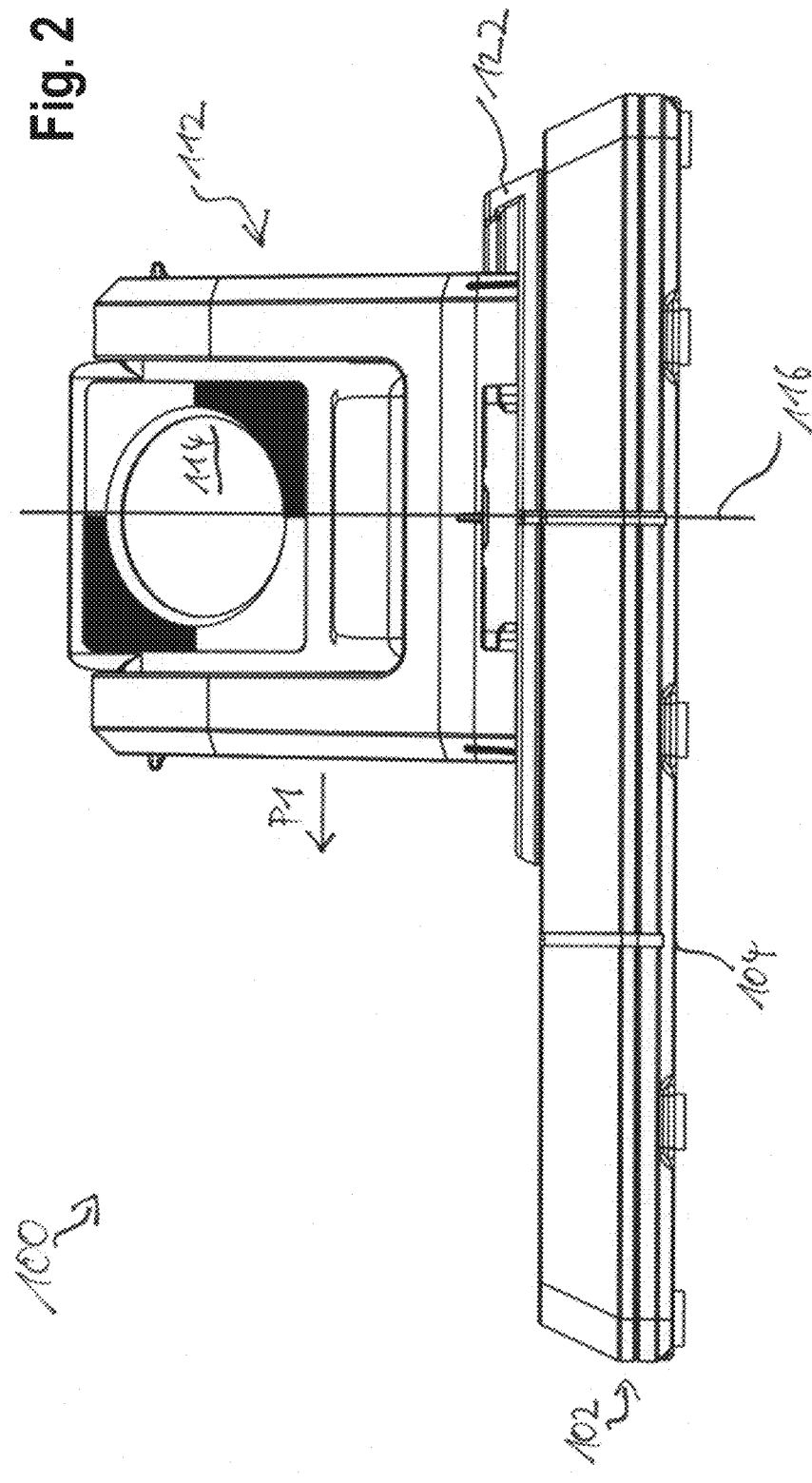
FIG. 2 shows a side view of the device.

FIG. 1 is a perspective view of a device 100 for placing markings. FIG. 2 is a side view of the device 100. The device 100 comprises a contact part 102 which can be placed with a contact side 104 against a component (not shown) in order to place a marking on the component. Preferably, the contact side 104 is planar. Furthermore, the contact part 102 comprises a first marking hole 106 and a second marking hole 108, which second marking hole, in the representation according to FIG. 1, is covered by a sliding element 110 and is therefore not visible. The first and second marking holes 106, 108 each form through holes in the contact part 102 so that the component against which the device 100 is placed is accessible through the marking holes 106, 108.

The sliding element 110 is shown in FIGS. 1 and 2 in a first position. The sliding element 110 is slidably connected to the contact part 102. In particular, the sliding element 110 is slidably arranged in the contact part 102 between the first position and a second position. For example, the arrow P1 indicates the direction to slide the sliding element 110 from the first position to the second position. When the sliding element 110 is in the second position, the first marking hole 106 is covered by the sliding element 110 and the second marking hole 108 is accessible. Thus, by sliding the sliding element 110, either the first marking hole 106 or the second marking hole 108 can be accessible or made accessible. Furthermore, the sliding element 110 is rotatably arranged in the contact part 102.

The sliding element 110 is connected to a reflector 112. The reflector includes a reflective element 114, which may be a prism, particularly a retroreflective triple prism. Alternatively, the reflective element 114 may be a reflective sheet. The reflector may also be referred to as a reflective target. Preferably, the reflective element 114 is tiltably disposed within the reflector.

In the shown first position of the sliding element 110, the reflector 112, in particular the reflective element 114, is arranged to intersect a first alignment axis 116. In particular, a center of the reflective element 114 intersects the alignment axis 116. The alignment axis 116 is further perpendicular to a plane defined by the contact side 104. This plane of the contact side 104 or the contact side 104 is intersected by the alignment axis 116 at a marking point defined by the second marking hole 108. The marking point is located at the location of the component that is accessible through marking hole 108 when the device 100 is placed against the component and at which a marking can be placed.

Another alignment axis 118 intersects the first marking hole 106 and the reflective element 114 when the sliding element 110 is in the second position, as described for the first position and the second marking hole 108. Further, the alignment axes 116, 118 intersect a tilt axis of the reflective element 114.

Thus, the sliding element 110 is arranged in its first position and in its second position respectively such that the reflective element 114 intersects either the alignment axis 116 or the further alignment axis 118. In particular, the center of the reflective element 114 intersects the respective alignment axis 116, 118.

The mode of operation of the device 100 is explained in more detail in the following. The reflective element 114 may reflect a light pulse emitted by a total station to the total station. This allows the distance between the total station and the reflective element 114 to be determined. Further, the angle of the light pulse emitted by the total station may be included; thus, the total station may determine the exact position of the reflective element relative to the total station in a manner known per se. Further, the total station may determine its own position relative to reference points.

Using construction data comprising the position of components of a structure with respect to the reference points, the reflective element 114, and hence the device 100, can be measured into positions of components or into positions on components using the total station. In particular, this allows the device 100 to be placed such that the marking point defined by the first or the second marking hole 106, 108 is located at the respective relevant position.

That is, when the device 100 is placed against the component and measured into the corresponding relevant position, the relevant position is accessible through the first or the second marking hole 106, 108. In doing so, the respective marking point and the relevant position are at least substantially coincident. Thus, a marking can be placed at the position on the component through the first or the second marking hole 106, 108. In other words, for placing a marking on the component by means of the device 100, the contact side 104 of the contact part 102 of the device 100 is placed against the component and marked through the first or the second marking hole 106, 108, for example with a pencil.

When placing the marking, it is further advantageous that the sliding element 110 is slidable between the first position and the second position. When the sliding element 110 is in its first position, the device 100, in particular the reflective element 114, is aligned with the component using the total station as described so that the second marking hole 108 is at least partially coincident with the relevant position. Subsequently, the sliding element 110 may be displaced to the second position and the relevant position may be marked through the second marking hole 108. The same procedure may be followed if the sliding element 110 is initially in the second position.

Additionally, one or more spirit levels 120 may be mounted to the sliding element 110. The spirit levels 120 can either be slid onto an optional protrusion 122 of the sliding element 110, or by means of an adapter 124 that can be inserted into an optional opening 126 of the sliding element 110 to firmly connect the spirit levels 120 to the sliding element 110. The spirit levels 120 are particularly suitable for ensuring or checking a correct alignment of the device 100 in space, in particular on the component.

Figure 3:
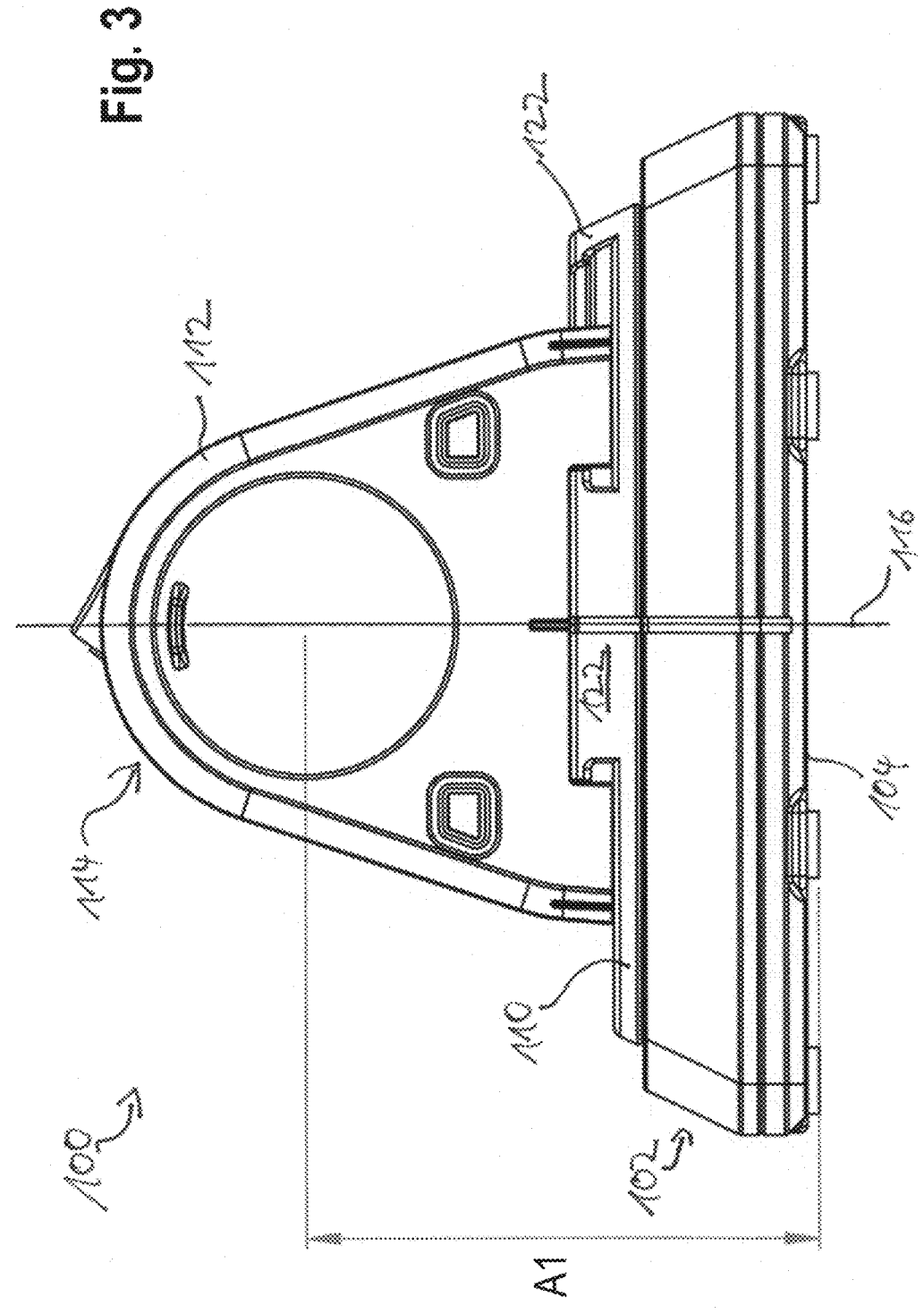
FIG. 3 shows another side view of the device.

FIG. 3 is another side view of the device 100. Compared to the side view in FIG. 2, the device 100 is rotated by 90° to the left. The center of the reflective element 114 has a distance A1 from the component, in particular from the marking point on the component defined by the second marking hole 108, along the alignment axis 116. The distance A1 is predetermined and preferably 50 mm. The same applies accordingly to the first marking hole 106 when the sliding element 110 is in its second position. Since the distance A1 is predetermined, i.e. known, the distance A1 can be taken into account when determining the position using the total station. Since the position of the marking point is determined only indirectly by the position of the reflective element 114, the concrete distance A1 can be used to infer the position of the marking point from the position of the reflective element 114 and thus be compensated for.

Figure 4:
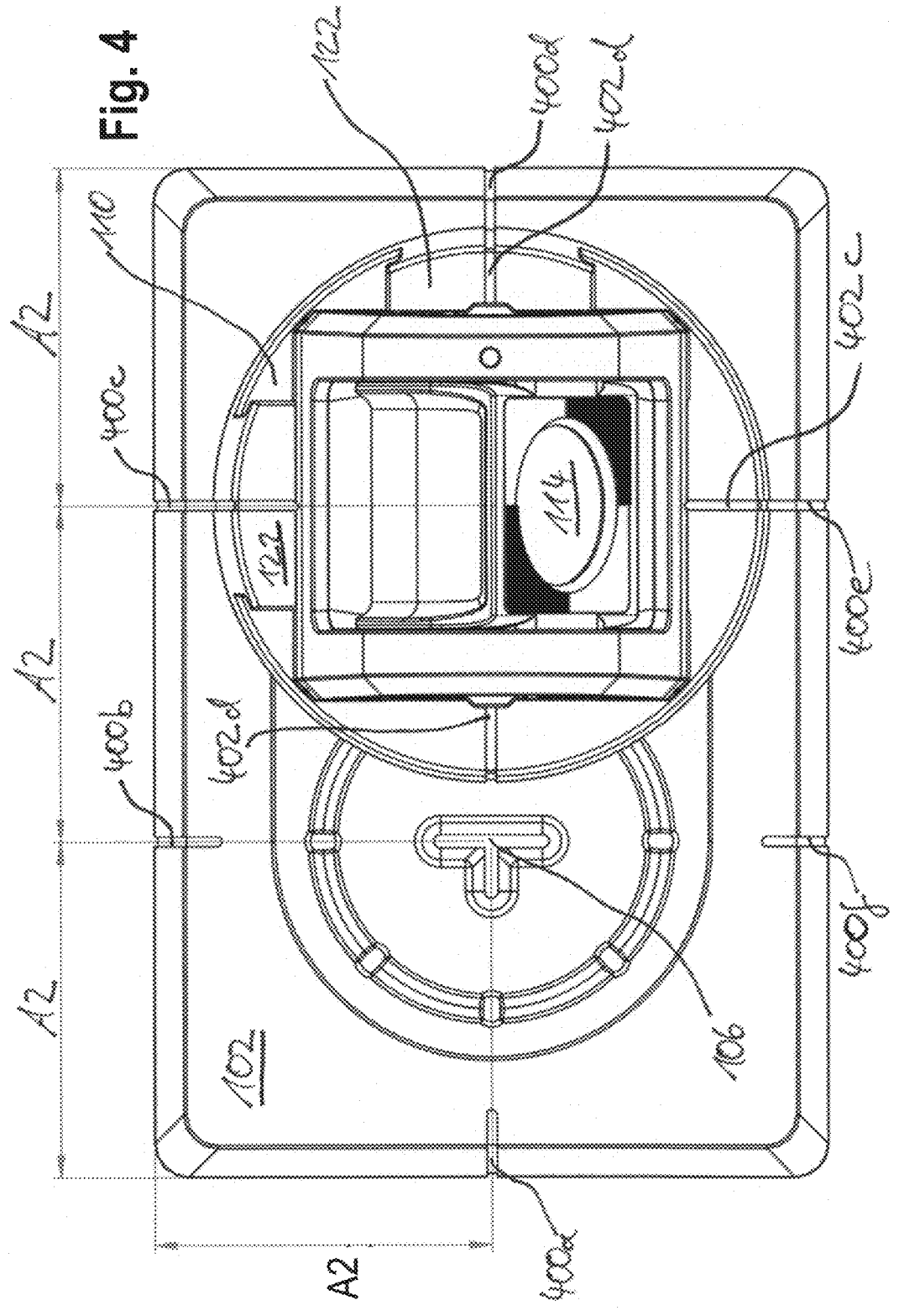
FIG. 4 shows a top view of the device.

FIG. 4 is a top view of the device 100. The contact part 102 has a substantially rectangular base surface. Further, the contact part 102 has marking lines 400a-400f, each pointing perpendicularly from an outer edge of the contact part 102 to one of the marking holes 106, 108. The marking lines 400a-400f are uniformly arranged on the contact part 102 such that the marking lines 400a-400f each have a distance A2 from the nearest parallel marking line 400a-400f and/or the nearest parallel edge of the contact part 102. The distance A2 is predetermined and in particular equal to the distance A1. Preferably, the distance A2 is 50 mm. This enables easy handling of the device 100, for example if further points are to be marked with the predetermined dimension starting from the marking point.

Additionally, the sliding element 110 may include marking lines 402a-402d that may be at least partially aligned in pairs with a portion of the marking lines 400a-400f, respectively, in the first and the second position of the sliding element 110.

The first marking hole 106 has a T-shape, as does the second marking hole 108. The marking point is defined by the intersection of the T-shape.

Figure 5:
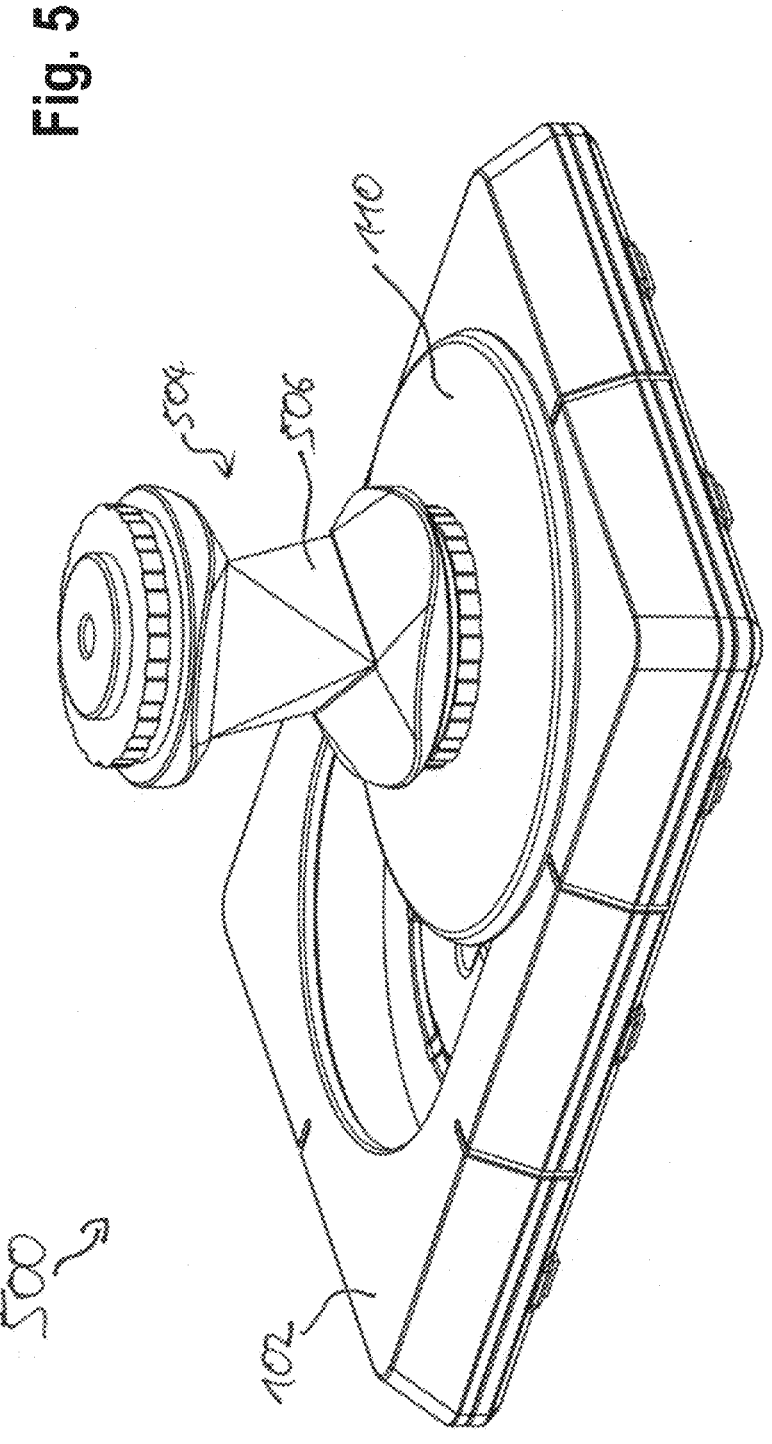
FIG. 5 shows a second embodiment of the device.

FIG. 5 shows a device 500 including the contact part 102 and a reflector 504. The reflector 504 includes a reflective element 506. The reflective element 506 can reflect light pulses back around its entire side surface. A center of the reflective element 506 may likewise intersect the alignment axes 116, 118, as previously described.

Figure 6:
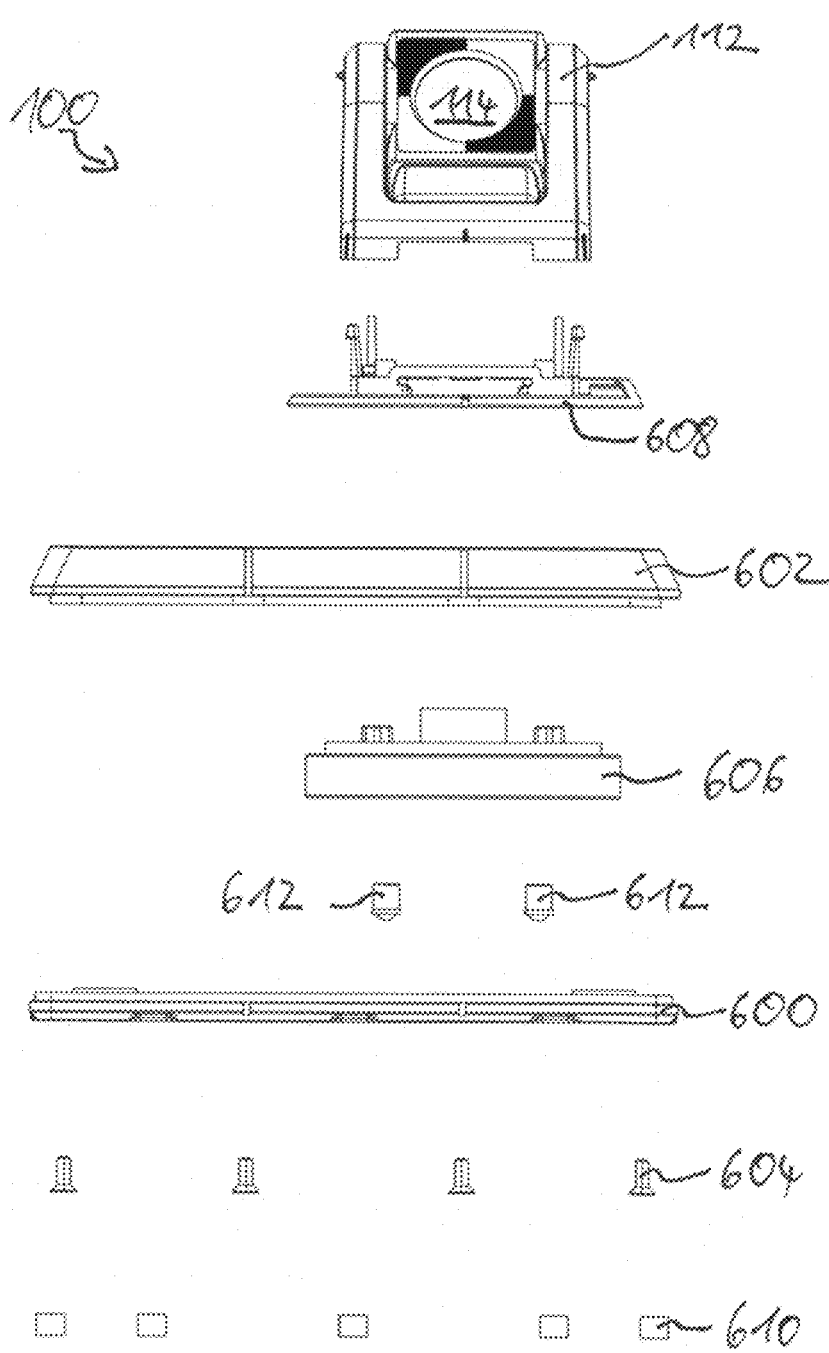
FIG. 6 shows an exploded view of the device according to FIG. 1.
Figure 7:
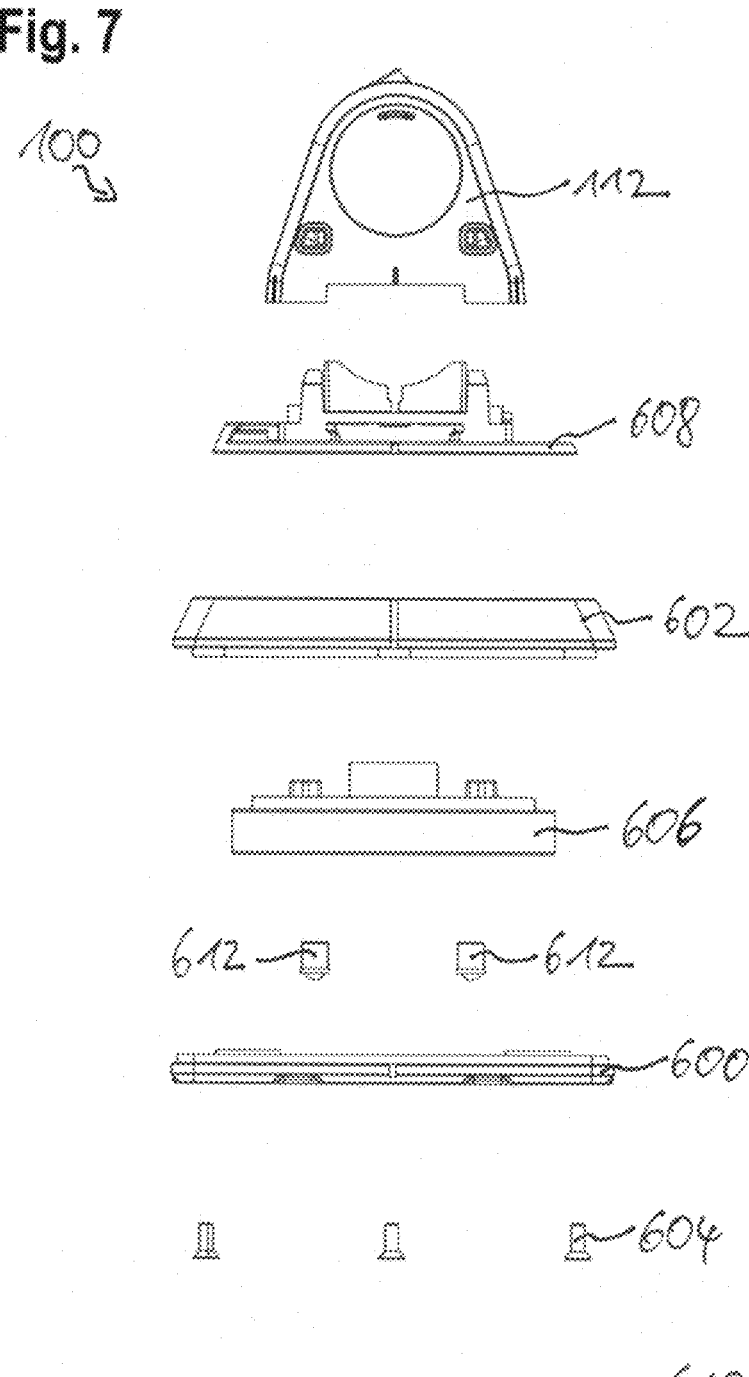
FIG. 7 shows another exploded view of the device according to FIG. 1.

FIGS. 6 and 7 are exploded views of the device 100. The view of FIG. 6 corresponds to the side view of FIG. 2 and the view of FIG. 7 corresponds to the side view of FIG. 3.

The contact part 102 comprises a contact plate 600 and a cover plate 602, which are connected to each other by means of connecting elements 604 (only one is marked with the reference sign 604), for example a plurality of screws. The sliding element 110 comprises two parts 606, 608, of which a first part 606 is guided in the contact part 102 and a second part 608 that is connected to the first part 606. The reflector 112 is connectable to the sliding element 110, in particular the second part 608, that is, the reflector 112 is reversibly connectable. For example, alternatively and alternately, the reflector 504 can also be connected to the sliding element 110.

The contact plate 600 includes elastic elements 610 on the contact side 104 (only one is identified with the reference symbol 610), which in particular prevent slippage when the device 100 is placed against the component. The elastic elements 610 may be, for example, a plurality of rubber elements.

The sliding element 110 comprises a plurality of ball thrust pieces 612 on a side facing the contact plate 600. The ball thrust pieces 612 comprise, for example, a press sleeve with an integrated spring and a rotatable ball elastically mounted on the spring. The ball thrust pieces 612 will be explained in more detail in connection with FIG. 8.

Figure 8:
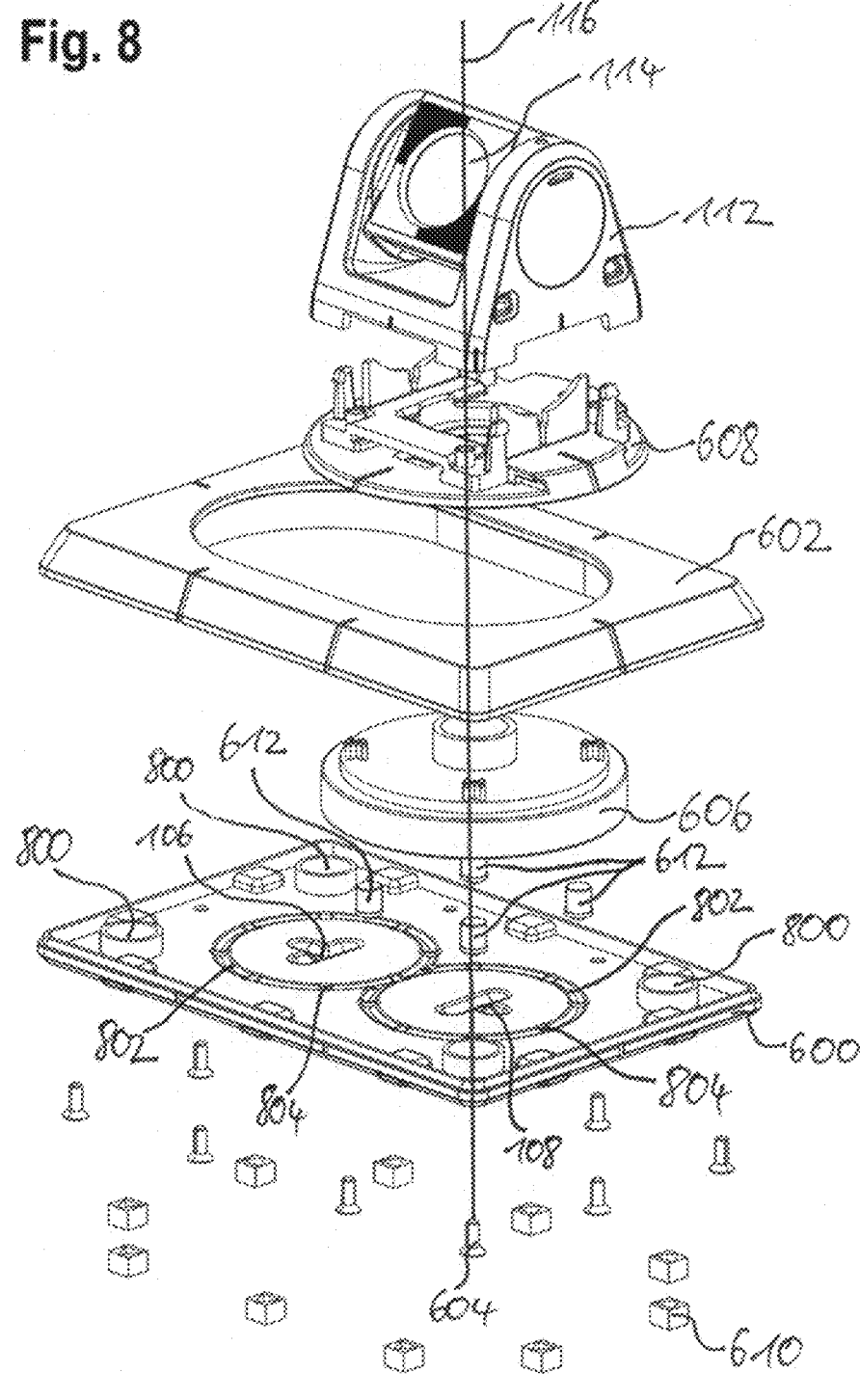
FIG. 8 is a perspective exploded view of the device according to FIG. 1.

FIG. 8 is a perspective exploded view of the device 100. The view of FIG. 8 corresponds to the perspective view of FIG. 1.

In addition to the elastic elements 610, the contact part 102 may include magnets 800 so that the device 100 can be reversibly held to a ferromagnetic component using magnetic force. In particular, this can also prevent slippage.

Further, the contact plate 600 includes two grooves 802. Engagement recesses 804 are provided along the grooves. The grooves 802 are circular recesses in the contact plate 600, and the engagement recesses 804 are in turn local recesses in the grooves 802. The engagement recesses 804 are evenly spaced along the grooves 802. In an assembled state of the device 100, the ball thrust pieces 612 are arranged in the sliding element 110 to engage one of the grooves 802 in the first and the second position of the sliding element 110. In particular, the rotatable balls of the ball thrust pieces 612 are engaged with the respective groove 802. As a result, the sliding element 110 is securely held in the respective first or second position and unintentional slippage is prevented. When the sliding element 110 is displaced, the elastically mounted balls are pressed into the sleeve of the ball thrust piece 612 when leaving one groove 802 and are displaced along the contact plate 600 in order to come into engagement with the respective other groove 802 when reaching this groove 802.

The sliding element 110 is arranged in the contact part 102 so as to be rotatable about the alignment axes 116, 118 at least in the first and the second position. In doing so, the ball thrust pieces 612 move along the respective groove 802 and engage in the respective position when the ball thrust pieces 612 engage with the engagement recesses 804. Thus, the sliding element 110 with the reflector 112, 504 can be securely held in various positions about the alignment axes 116, 118.

Figure 9:
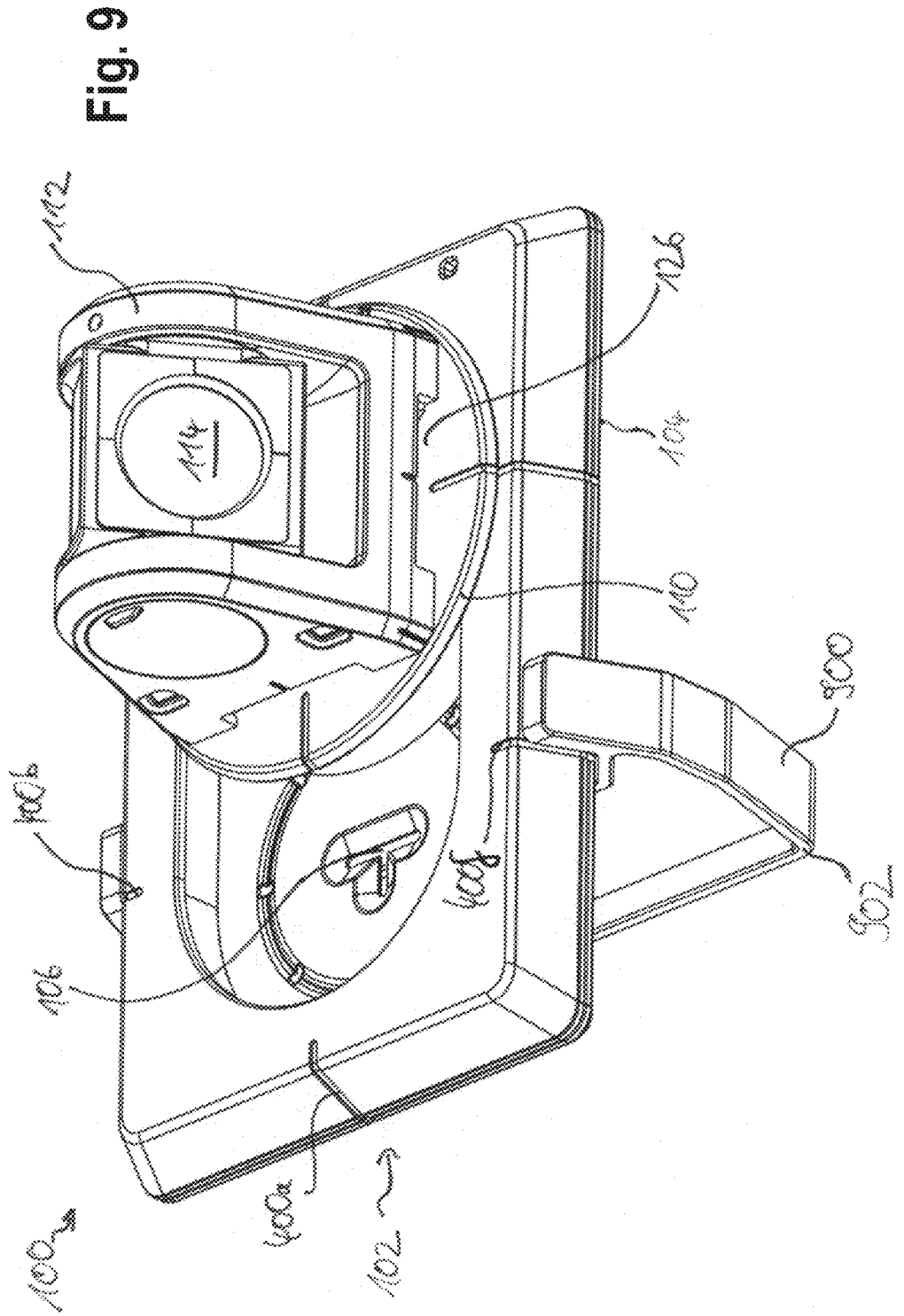
FIG. 9 is a perspective view of the device with an edge part.
Figure 10:
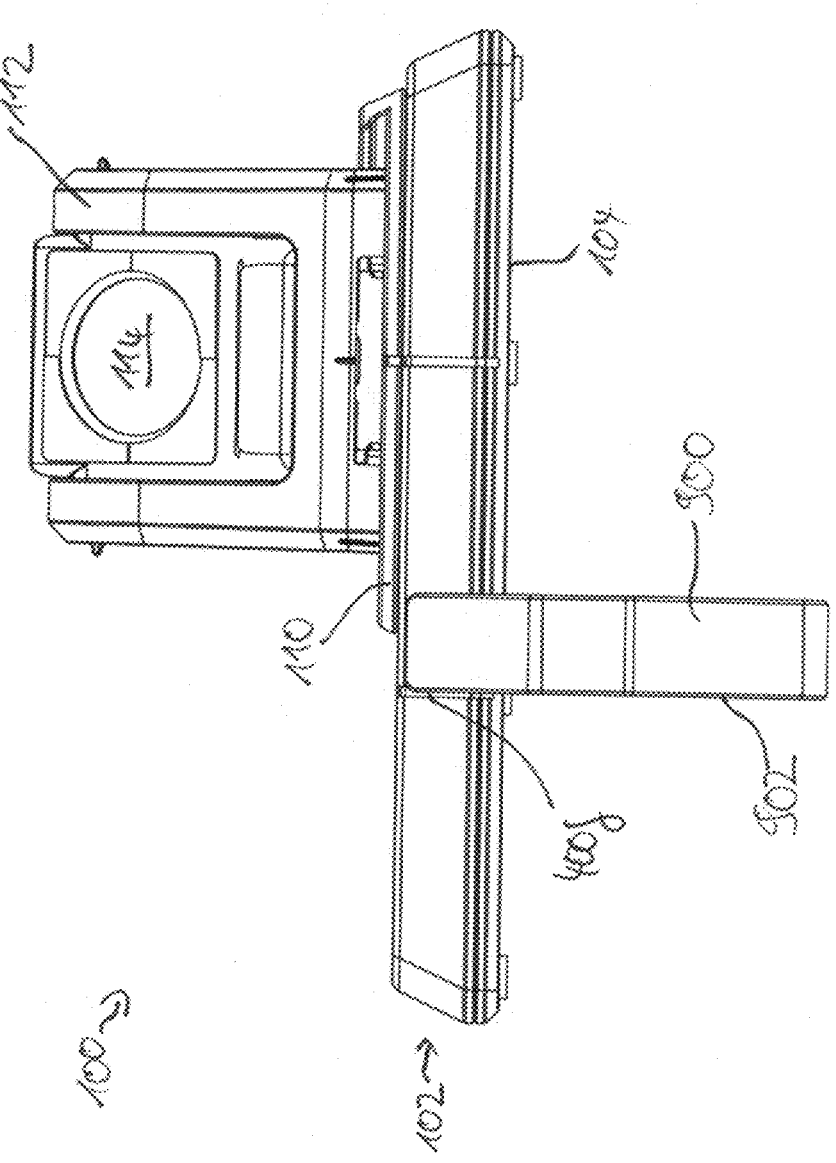
FIG. 10 is a side view of the device according to FIG. 9.

FIG. 9 is a perspective view of the device 100 with an edge part 900. FIG. 10 is a corresponding side view. The edge part 900 is detachably connected to the contact part 102. Preferably, the edge part 900 is arranged to form a 90° angle with the contact part 102. In particular, the contact side 104 of the contact part 102 and a contact side 902 of the edge part 900 form a 90° angle. Further, the contact side 902 of the edge part 900 lies in a plane in which the further alignment axis 118 lies. Thus, when the contact sides 104, 902 are placed against an edge of a component, the alignment axis 118 lies exactly at the edge of the component. This makes it particularly easy to place a marking on the edge of the component or to check an existing edge for its exact position.

Preferably, the edge part 900 is arranged such that marking lines 400b, 400f lie in the plane of the contact side 902 of the edge part 900.

Further, the edge part 900 may alternatively be aligned with the alignment axis 116.

Identical or similarly acting elements are identified with the same reference signs in all figures.

What is claimed is:

1. A device for placing markings on one or more components, with a contact part to be placed against the one or more components, with the contact part comprising at least one contact plate, a sliding element which is slidably arranged on the contact part between a first and a second position, wherein the sliding element comprises at least one ball thrust piece, and

a reflector which is connected to the sliding element, wherein the contact part comprises at least a continuous marking hole defining a marking point, wherein the marking point and the reflector are arranged along an alignment axis when the sliding element is in the first position, wherein the marking hole is accessible when the sliding element is in the second position, and wherein the at least one contact plate comprises a groove on a side facing the sliding element, wherein the ball thrust piece is guidable along the groove, and wherein the groove is arranged in a circle around the alignment axis.

2. The device according to claim 1, wherein the alignment axis is orthogonal to a plane defined by the contact part.

3. The device according to claim 1, wherein the reflector comprises a reflective element and a distance between the marking point and a center of the reflective element along the alignment axis is a predetermined distance.

4. The device according to claim 1, wherein the contact part comprises markings, each of which being arranged along a line from the marking point of the marking hole to one of the sides of the contact part.

5. The device according to claim 1, wherein the sliding element is rotatable about the alignment axis at least in the first position or in the second position.

6. The device according to claim 1, wherein the contact plate comprises at least one engagement recess on the side facing the sliding element, into which the ball thrust piece engages when the sliding element is in the first or the second position.

7. The device according to claim 1, wherein the sliding element comprises at least one receiving projection onto which an alignment element can be slid.

8. The device according to claim 1, with an edge part that is arranged releasably on the contact part, wherein one side of the edge part forms an edge part plane that intersects another plane defined by the contact part at a right angle and the alignment axis lies in the edge part plane of the edge part.

9. The device according to claim 1, wherein the contact part comprises a further marking hole defining a further marking point.

10. The device according to claim 3, wherein the further marking point and the reflector are arranged along a further alignment axis when the sliding element is in the second position.

11. The device according to claim 1, wherein the contact part has a substantially rectangular base surface.

12. The device according to claim 11, wherein the contact part is configured such that a distance from the marking point of the marking hole to three sides of the base surface of the contact part is each time a further predetermined distance.

13. The device according to claim 12, wherein the predetermined distance is equal to the further predetermined distance.

* * * * *